United States Patent
Wang et al.

(10) Patent No.: US 10,651,503 B2
(45) Date of Patent: May 12, 2020

(54) OLIGOMER-POLYMER AND LITHIUM BATTERY

(71) Applicant: National Taiwan University of Science and Technology, Taipei (TW)

(72) Inventors: Fu-Ming Wang, Taipei (TW); Quoc Thai Pham, Taipei (TW); Chorng-Shyan Chern, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 15/865,295

(22) Filed: Jan. 9, 2018

(65) Prior Publication Data

US 2019/0140316 A1   May 9, 2019

(30) Foreign Application Priority Data

Nov. 6, 2017   (TW) .............................. 106138321 A

(51) Int. Cl.
| | | |
|---|---|---|
| *H01M 4/02* | (2006.01) | |
| *H01M 10/0565* | (2010.01) | |
| *H01M 10/052* | (2010.01) | |
| *H01M 10/0567* | (2010.01) | |
| *H01M 4/62* | (2006.01) | |
| *H01M 10/42* | (2006.01) | |
| *H01M 10/0525* | (2010.01) | |

(52) U.S. Cl.
CPC ......... *H01M 10/0565* (2013.01); *H01M 4/62* (2013.01); *H01M 10/052* (2013.01); *H01M 10/0525* (2013.01); *H01M 10/0567* (2013.01); *H01M 10/4235* (2013.01); *H01M 2004/028* (2013.01); *H01M 2300/0025* (2013.01)

(58) Field of Classification Search
CPC ....................................................... H01M 4/02
See application file for complete search history.

(56) References Cited

U.S. PATENT DOCUMENTS

| | | |
|---|---|---|
| 7,316,866 B2 | 1/2008 | Yong et al. |
| 9,012,096 B2 | 4/2015 | Amine et al. |
| 2013/0252113 A1 | 9/2013 | Yu et al. |

(Continued)

FOREIGN PATENT DOCUMENTS

| | | |
|---|---|---|
| CN | 103000884 | 3/2013 |
| CN | 106463721 | 2/2017 |

(Continued)

OTHER PUBLICATIONS

Fujita et al. ("Thermal and kinetic analyses on Michael addition reaction of acrylic acid" Journal of Thermal Analysis and Calorimetry (May 2017, vol. 128, Issue 2, pp. 1227-1233) First online Dec. 8, 2016).*

(Continued)

*Primary Examiner* — Jacob B Marks
(74) *Attorney, Agent, or Firm* — JCIPRNET

(57) ABSTRACT

An oligomer-polymer and a lithium battery are provided. The oligomer-polymer is obtained by a polymerization of a polymerizable compound having at least one ethylenically unsaturated group and at least one active hydrogen group in the same molecule. The lithium battery includes an anode, a cathode, a separator, an electrolyte solution and a package structure, wherein the cathode includes the oligomer-polymer.

7 Claims, 1 Drawing Sheet

(56) References Cited

U.S. PATENT DOCUMENTS

2016/0344034 A1* 11/2016 Yamamoto ............ H01M 4/625
2017/0271726 A1* 9/2017 Shen ................... H01M 10/613

FOREIGN PATENT DOCUMENTS

| JP | 2011-076983 | * | 4/2011 |
| TW | 201727986 | | 8/2017 |

OTHER PUBLICATIONS

Michiya Fujita, et al., "Thermal and kinetic analyses on Michael addition reaction of acrylic acid", The International Journal of Thermal Analysis and Calorimetry, vol. 128, May 2017, pp. 1227-1233.

Office Action of Taiwan Counterpart Application, dated Aug 15, 2018, pp. 1-6.

* cited by examiner

OLIGOMER-POLYMER AND LITHIUM BATTERY

CROSS-REFERENCE TO RELATED APPLICATION

This application claims the priority benefit of Taiwan application serial no. 106138321, filed on Nov. 6, 2017. The entirety of the above-mentioned patent application is hereby incorporated by reference herein and made a part of this specification.

BACKGROUND

Technical Field

The invention relates to an oligomer-polymer and a battery, and more particularly, to an oligomer-polymer used for a lithium battery and the lithium battery.

Description of Related Art

Since primary batteries are not environment-friendly, the market demand for secondary lithium batteries with characteristics such as rechargeability, light weight, high voltage value, and high energy density has been growing in recent years. As a result, the current performance requirements for secondary lithium batteries such as light weight, durability, high voltage, high energy density, and high safety have become higher. In particular, secondary lithium batteries have very high potential in the application and expandability of light electric vehicles, electric vehicles, and the large power storage industry.

However, among the commercialized secondary lithium batteries in the general market, since lithium transition metal oxide is used as the cathode, the cathode readily reacts with the electrolyte solution in high temperature applications and becomes damaged. As a result, oxygen in the lithium metal oxide is released and becomes part of a combustion reaction. This is one of the main causes for the explosion, swelling, and performance degradation of the secondary lithium battery. Therefore, maintaining the structural stability of the cathode material continuously with high performance in high temperature applications is one of the desired goals of those skilled in the art.

SUMMARY

The invention provides an oligomer-polymer which can be applied to a cathode material of a lithium battery, so that the lithium battery has good performance.

The invention provides a lithium battery having the oligomer-polymer.

The oligomer-polymer of the invention is obtained by a polymerization of a polymerizable compound having at least one ethylenically unsaturated group and at least one active hydrogen group in the same molecule.

In an embodiment of the invention, the oligomer-polymer is obtained by a Michael addition reaction of the polymerizable compound.

In an embodiment of the invention, the active hydrogen group is, for example, a hydroxyl group, a mercapto group, or an amino group.

In an embodiment of the invention, the polymerizable compound is, for example, uracil, thymine, or cytosine.

In an embodiment of the invention, a reaction temperature of the polymerization is between 50° C. to 200° C.

The lithium battery of the invention includes an anode, a cathode, a separator, an electrolyte solution and a package structure. The cathode is disposed separately from the anode, and the cathode includes the oligomer-polymer. The separator is disposed between the anode and the cathode, and the separator, the anode, and the cathode define a receiving region. The electrolyte solution is disposed in the receiving region. The package structure encloses the anode, the cathode, and the electrolyte solution.

In an embodiment of the lithium battery of the invention, the electrolyte solution includes an organic solvent, a lithium salt, and an additive, wherein the additive is, for example, monomaleimide, polymaleimide, bismaleimide, polybismaleimide, a copolymer of bismaleimide and monomaleimide, vinylidene carbonate, or a mixture thereof.

In view of above, the oligomer-polymer of the invention is prepared by using a polymerizable compound having at least one ethylenically unsaturated group and at least one active hydrogen group in the same molecule. The oligomer-polymer of the invention can be applied in a cathode material of a lithium battery such that the lithium battery still has good capacity, battery efficiency, and charge-discharge cycle life even in a high temperature operation.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
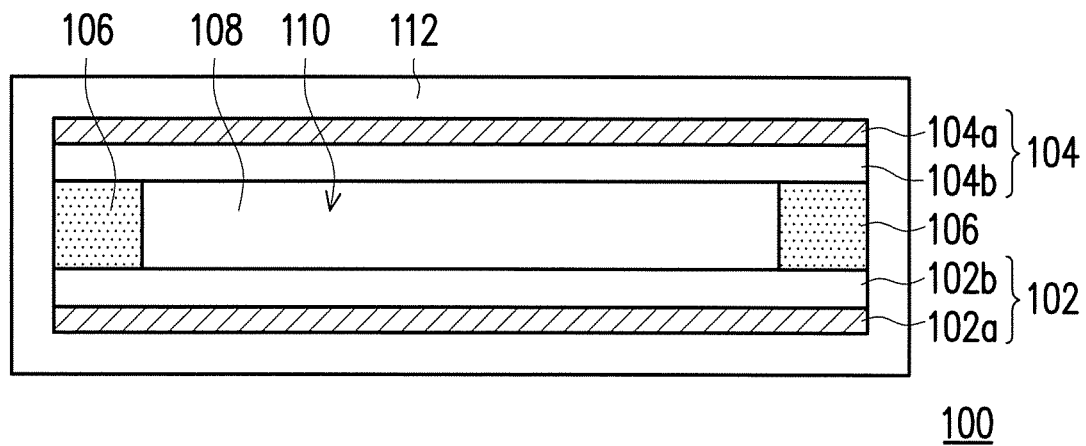
FIG. 1 is a schematic cross-sectional view of a lithium battery according to an embodiment of the invention.

As used herein, a range represented by "one number to another number" is a general representation to omit listing all numbers within the range in the specification. Therefore, the recitation of a particular numerical range encompasses any numbers within that range as well as a narrower numerical range defined by any numbers of that range, as if the any numbers and the narrower range are specified in the specification.

In order to prepare an oligomer-polymer that can be applied in a cathode material of a lithium battery to make the lithium battery have good performance, the invention provides an oligomer-polymer that achieves the above-mentioned advantages. In the following, the embodiments are provided as illustrations of the implementation of the invention.

One embodiment of the invention provides an oligomer-polymer which is obtained by a polymerization of a polymerizable compound having at least one ethylenically unsaturated group and at least one active hydrogen group in the same molecule. In this embodiment, the active hydrogen group of the polymerizable compound is, for example, a hydroxyl group, a mercapto group, or an amino group, but the invention is not limited thereto.

In this embodiment, the polymerizable compound having at least one ethylenically unsaturated group and at least one active hydrogen group in the same molecule is, for example, uracil, thymine or cytosine, but the invention is not limited thereto. Specifically, the active hydrogen group of cytosine, uracil and thymine is a secondary amino group.

In addition, in this embodiment, the oligomer-polymer is obtained by a Michael addition reaction of a polymerizable compound having at least one ethylenically unsaturated group and at least one active hydrogen group in the same molecule. Specifically, the oligomer-polymer is obtained by the Michael addition reaction of the active hydrogen group of the polymerizable compound with a carbon-carbon double bond in the ethylenically unsaturated group of another polymerizable compound. For example, the ethylenically unsaturated group of uracil may be subjected to a Michael addition reaction with a secondary amino group of another uracil as shown in Formula 1 below.

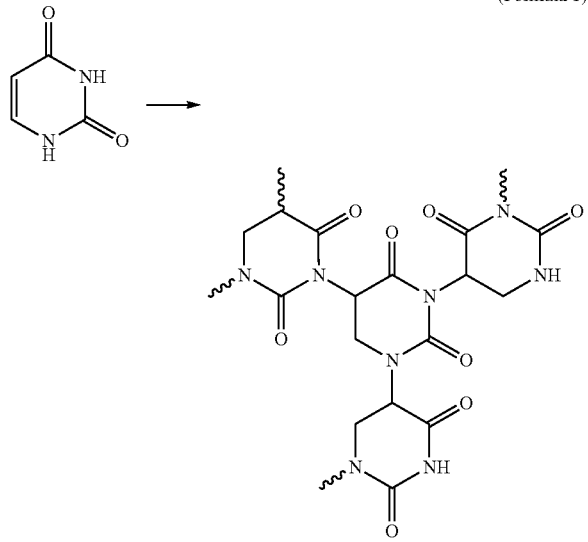

(Formula 1)

In addition, in this embodiment, a free radical addition reaction can also occur between polymerizable compounds having at least one ethylenically unsaturated group and at least one active hydrogen group in the same molecule. Specifically, the free radical addition reaction can occur between the ethylenically unsaturated groups of the molecules of the same polymerizable compound. For example, the free radical addition reaction can occur between the carbon-carbon double bonds of the molecules of uracil as shown in Formula 2 below.

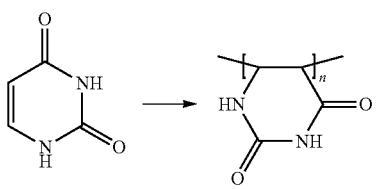

(Formula 2)

where n is an integer from 50 to 50001.

In one embodiment, a method for polymerizing the polymerizable compound having an ethylenically unsaturated group and an active hydrogen group in the same molecule includes, for example, making the polymerizable compound dissolved in a solvent, and reacted for 0.5 to 24 hours at a temperature of 50° C. to 200° C.

The content of the polymerizable compound is 5 wt. % to 20 wt. % based on the total amount of the polymerizable compound and the solvent. If the content of the polymerizable compound is less than 5 wt. %, the reactivity of Michael addition reaction is poor so that the molecular weight of the oligomer-polymer is too small to effectively reduce heat released by the electrode of the lithium battery. If the content of the polymerizable compound is higher than 20 wt. %, the molecular weight of the oligomer-polymer is too large and the fluidity is not good. As a result, the difficulty in preparation of the electrode increases and the oligomer-polymer is thus not conducive to be applied in the lithium battery.

The oligomer-polymer of the invention can be used in a cathode material of a lithium battery. Further, due to the good thermal reactivity, the oligomer-polymer of the invention can form a protective layer on the surface of the cathode material to effectively prevent the cathode structure from the damage resulted from the high temperature environment for the following reasons. Due to the highly-branched structure, the formed oligomer-polymer can form a stable organic polymer with metal oxides of typical cathode materials, and due to the high thermal reactivity, high thermal stability, and rigid chemical structure of the oligomer-polymer, the protective layer formed by the oligomer-polymer also has high thermal stability. In this way, the lithium battery employing the cathode material containing the oligomer-polymer of the invention can have good capacity, battery efficiency, safety in a high temperature environment and can have the excellent cycle life of the battery.

The lithium battery including the oligomer-polymer of the invention will be described below.

FIG. 1 is a schematic cross-sectional view of a lithium battery according to an embodiment of the invention. Referring to FIG. 1, a lithium battery 100 includes an anode 102, a cathode 104, a separator 106, an electrolyte solution 108, and a package structure 112.

The anode 102 includes an anode metal foil 102a and an anode material 102b, wherein the anode material 102b is disposed on the anode metal foil 102a by coating or sputtering. The anode metal foil 102a is, for example, a copper foil, an aluminum foil, a nickel foil, or a highly conductive stainless steel foil. The anode material 102b is, for example, carbide or metallic lithium. The carbide is, for example, carbon powder, graphite, carbon fiber, carbon nanotube, graphene or a mixture thereof. However, in other embodiments, the anode 102 may also include only the anode material 102b.

The cathode 104 is disposed separately from the anode 102. The cathode 104 includes a cathode metal foil 104a and a cathode material 104b, wherein the cathode material 104b is disposed on the cathode metal foil 104a by coating. The cathode metal foil 104a is, for example, a copper foil, an aluminum foil, a nickel foil, or a highly conductive stainless steel foil. The cathode material 104b includes the oligomer-polymer of the invention and a lithium mixed transition metal oxide. The lithium mixed transition metal oxide is, for example, $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_mNi_{1/3}O_2$, $LiMc_{0.5}Mn_{1.5}O_4$, or a combination thereof, where $0<x<1$ and Mc is a divalent metal.

The content of the oligomer-polymer is 0.5 to 5 parts by weight, preferably 1 to 3 parts by weight, based on 100 parts by weight of the total weight of the cathode material 104b, and the content of the lithium mixed transition metal oxide is, for example, 80 to 95 parts by weight. If the content of the oligomer-polymer is less than 0.5 parts by weight, the safety characteristic of the battery is not obvious; if the content of the oligomer-polymer is more than 5 parts by weight, the battery cycle life is not good.

In addition, the lithium battery 100 may further include a polymer binder. The polymeric binder reacts with the anode 102 and/or the cathode 104 to increase the mechanical properties of the electrode. In detail, the anode material 102b may be adhered to the anode metal foil 102a through the polymer binder, and the cathode material 104b may be adhered to the cathode metal foil 104a through the polymer binder. The polymer binder is, for example, polyvinylidenefluoride (PVDF), styrene-butadiene rubber (SBR), polyamides, melamine resins or a combination thereof.

The separator 106 is disposed between the anode 102 and the cathode 104, and the separator 106, the anode 102, and the cathode 104 define a receiving region 110. The material of the separator 106 is an insulating material such as polyethylene (PE), polypropylene (PP), or a composite structure formed of the above materials such as PE/PP/PE.

The electrolyte solution 108 is disposed in the receiving region 110. The electrolyte solution 108 includes an organic solvent, a lithium salt, and an additive. The amount of the organic solvent accounts for 55 wt. % to 90 wt. % of the electrolyte solution 108, the amount of the lithium salt accounts for 10 wt. % to 35 wt. % of the electrolyte solution 108, and the amount of the additive accounts for 0.05 wt. % to 10 wt. % of the electrolyte solution 108. However, in other embodiments, the electrolyte solution 108 may also not contain the additive.

The organic solvent is, for example, γ-butyrolactone, ethylene carbonate (EC), propylene carbonate, diethyl carbonate (DEC), propyl acetate (PA), dimethyl carbonate (DMC), ethylmethyl carbonate (EMC), or a combination thereof.

The lithium salt is, for example, $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$ or a combination thereof.

The additive is, for example, monomaleimide, polymaleimide, bismaleimide, polybismaleimide, a copolymer of bismaleimide and monomaleimide, vinylidene carbonate (VC), or a mixture thereof. Monomaleimide is, for example, selected from the group consisting of N-phenylmaleimide, N-(o-methylphenyl)-maleimide, N-(m-methylphenyl)-maleimide, N-(p-methylphenyl)-maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl)maleimide and 2,6-xylylmaleidmide.

The package structure 112 encloses the anode 102, the cathode 104, and the electrolyte solution 108. The material of the package structure 112 is, for example, an aluminum foil.

Moreover, the cathode 104 can be formed in the conventional battery manufacturing process by adding the oligomer-polymer of the invention into the cathode material. Therefore, the capacity, battery efficiency, and charge-discharge cycle life of the lithium battery 100 can be effectively maintained at high temperature without modifying any battery design, battery material, and electrolyte solution. The lithium battery 100 thus has higher safety.

The effects of the oligomer-polymer of the invention will be described below with experimental examples and comparative examples.

Experimental Example 1

Preparation of Anode

Metal lithium was cut into an appropriate shape and inserted directly to form the anode.

Preparation of Cathode 2 parts by weight (1 g) of uracil was charged into a reactor loaded with 20 g of N-methylpyrrolidone (NMP) solvent, and was reacted for 18 hours at 130° C. to prepare the oligomer-polymer of experimental example 1.

Next, 90 parts by weight of $LiAl_{0.05}Co_{0.95}O_2$, 5 parts by weight of polyvinylidenefluoride (PVDF), and 5 parts by weight of acetylene black (conductive powder) were evenly mixed in the N-methylpyrrolidone solvent. Next, 1.5 parts by weight of the oligomer-polymer of experimental example 1 was added to the mixed solution to form a cathode material. Then, after the material was coated on an aluminum foil, the aluminum foil with the material coated thereon was dried, compressed, and then cut to form the cathode.

Preparation of Electrolyte Solution $LiPF_6$ was dissolved in a mixture of propylene carbonate (PC), ethylene carbonate (EC) and diethyl carbonate (DEC) (volume ratio of PC/EC/DEC=2/3/5) to prepare the electrolyte solution having a concentration of 1M, wherein the mixed solution is used as an organic solvent in the electrolytic solution, and $LiPF_6$ is used as a lithium salt in the electrolytic solution.

Fabrication of Lithium Battery

After using polypropylene as the separator to isolate the anode and the cathode and after the receiving region was defined, the electrolyte solution was added to the receiving region between the anode and the cathode. Lastly, the above structure is sealed with the package structure to complete the fabrication of the lithium battery of experimental example 1.

Comparative Example 1

Preparation of Anode

The procedure for preparing the anode of comparative example 1 is the same as experimental example 1.

Preparation of Cathode

Maleimide and barbituric acid with a molar ratio of 2:1 were charged into a reactor loaded with N-methylpyrrolidone (NMP) and were reacted for 18 hours at 130° C. to prepare the oligomer-polymer of comparative example 1.

Next, 90 parts by weight of $LiAl_{0.05}Co_{0.95}O_2$, 5 parts by weight of polyvinylidenefluoride (PVDF), and 5 parts by weight of acetylene black (conductive powder) were evenly mixed in N-methylpyrrolidone (NMP) solvent. Next, 1.5 parts by weight of the oligomer-polymer of comparative example 1 was added to the mixed solution to foils a cathode material. Then, after the material was coated on an aluminum foil, the aluminum foil with the material coated thereon was dried, compressed, and then cut to form the cathode.

Preparation of Electrolyte Solution

The procedure for preparing the electrolyte solution of comparative example 1 is the same as experimental example 1.

Fabrication of Lithium Battery

The procedure for preparing the lithium battery of comparative example 1 is similar to that of experimental example 1 except that the cathode material of the lithium battery of comparative example 1 included the oligomer-polymer of comparative example 1, and the cathode material of the lithium battery of experimental example 1 included the oligomer-polymer of experimental example 1.

Comparative Example 2

Preparation of Anode
The procedure for preparing the anode of comparative example 2 is the same as experimental example 1.
Preparation of Cathode
The procedure for preparing the lithium battery of comparative example 2 is similar to that of experimental example 1 except that no cathode material additive was added into the cathode material of comparative example 2.
Preparation of Electrolyte Solution
The procedure for preparing the electrolyte solution of comparative example 2 is the same as experimental example 1.
Fabrication of Lithium Battery
The procedure for preparing the lithium battery of comparative example 2 is similar to that of experimental example 1 except that no cathode material additive was added into the cathode material of the lithium battery of comparative example 2, and the cathode material of the lithium battery of experimental example 1 included the oligomer-polymer of experimental example 1.

Figure 2:
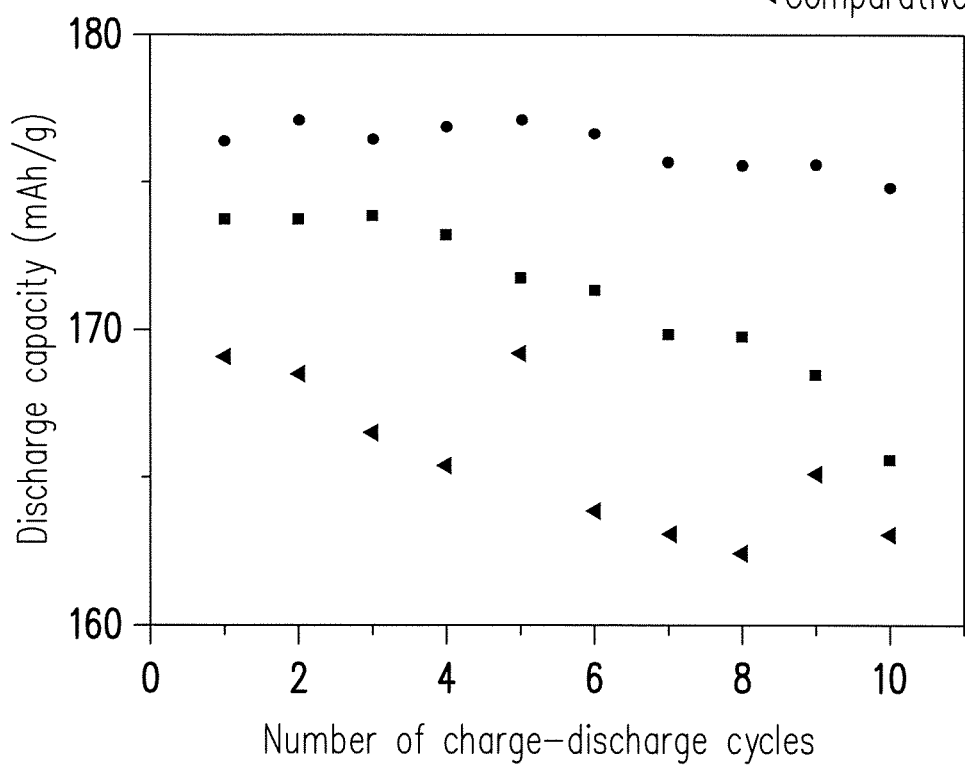
FIG. 2 is a diagram illustrating the relationship between the number of charge-discharge cycles and discharge capacity of the lithium battery of each of experimental example 1, comparative example 1, and comparative example 2 at room temperature.

Next, the lithium batteries of experimental example 1, comparative example 1, and comparative example 2 were subjected to the cycle life test. FIG. 2 is a diagram illustrating the relationship between the number of charge-discharge cycles and discharge capacity of the lithium battery of each of experimental example 1, comparative example 1, and comparative example 2 at room temperature. It can be known from FIG. 2 that in comparison with the lithium battery with the conventional cathode material additive (comparative example 1) and the lithium battery without the cathode material additive (comparative example 2), when the lithium battery employs the oligomer-polymer of the invention (experimental example 1), the cycle life of the lithium battery of the experimental example 1 is significantly higher than that of comparative example 1 and comparative example 2, which shows that the oligomer-polymer of the invention can effectively improve the battery performance.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. An oligomer-polymer obtained by a polymerization of a polymerizable compound as a starting monomer having at least one ethylenically unsaturated group and at least one active hydrogen group in the same molecule,
    wherein the polymerizable compound comprises uracil, thymine, or cytosine.

2. The oligomer-polymer according to claim 1, wherein the oligomer-polymer is obtained by a Michael addition reaction of the polymerizable compound.

3. The oligomer-polymer according to claim 1, wherein the active hydrogen group comprises a hydroxyl group, a mercapto group, or an amino group.

4. The oligomer-polymer according to claim 1, wherein a reaction temperature of the polymerization is between 50° C. to 200° C.

5. A lithium battery, comprising:
    an anode;
    a cathode disposed separately from the anode, wherein the cathode comprises the oligomer-polymer according to claim 1;
    a separator disposed between the anode and the cathode, wherein the separator, the anode, and the cathode define a receiving region;
    an electrolyte solution disposed in the receiving region; and
    a package structure enclosing the anode, the cathode, and the electrolyte solution.

6. The lithium battery according to claim 5, wherein the electrolyte solution comprises an organic solvent, a lithium salt, and an additive.

7. The lithium battery according to claim 6, wherein the additive comprises monomaleimide, polymaleimide, bismaleimide, polybisaleimide, a copolymer of bismaleimide and mono-maleimide, vinylene carbonate, or a mixture thereof.

* * * * *